April 24, 1956 — J. G. IMPARATO — 2,743,031
ADAPTOR COUPLING RINGS FOR DRUMS
Filed Jan. 19, 1953
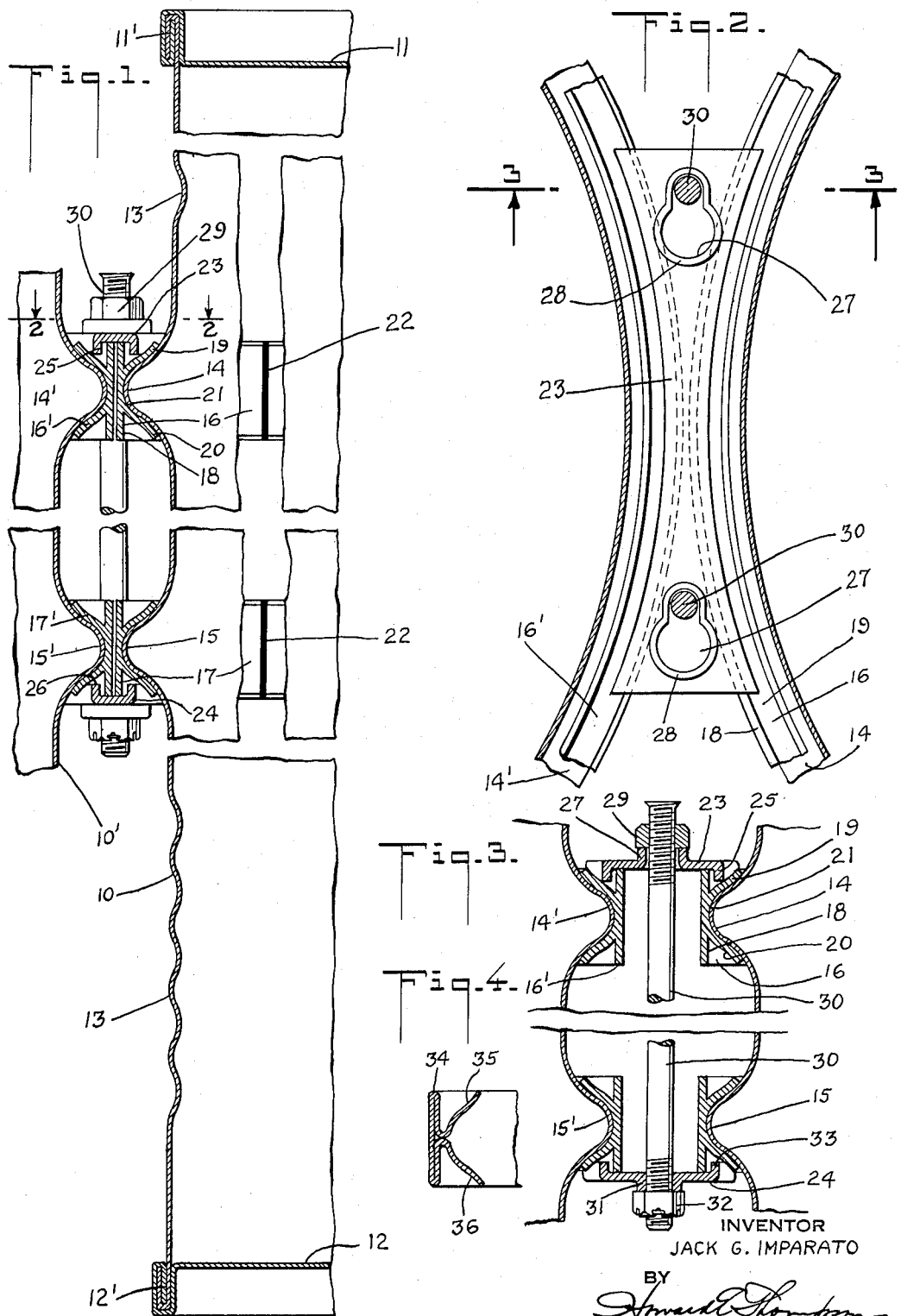
INVENTOR
JACK G. IMPARATO
BY
ATTORNEY

United States Patent Office 2,743,031
Patented Apr. 24, 1956

2,743,031

ADAPTOR COUPLING RINGS FOR DRUMS

Jack G. Imparato, Brooklyn, N. Y., assignor of one-half to John J. Imparato, Brooklyn, N. Y.

Application January 19, 1953, Serial No. 331,791

3 Claims. (Cl. 220—23.4)

This invention relates to what are generally referred to as drums used in the shipment of fluid and other materials and, particularly, drums employing annular rounded beads in the wall structure thereof intermediate opposed ends of the drum. More particularly, the invention deals with what might be termed adaptor rings for mounting on the annular beads to facilitate coupling of drums in a nested or close proximity to each other to facilitate shipment of the drums as well as bulk handling thereof.

Still more particularly, the invention deals with a coupling clamp for engaging the drum rings in supporting adjacent drums against relative movement one with respect to the other.

The novel features of the invention will be best understood from the following description, when taken together with the accompanying drawing, in which certain embodiments of the invention are disclosed and, in which, the separate parts are designated by suitable reference characters in each of the views and, in which:

Fig. 1 is a broken sectional view of the central portion of two drums and illustrating one drum partly in elevation and further illustrating the clamp for securing the drums together.

Fig. 2 is a sectional plan view on the line 2—2 of Fig. 1.

Fig. 3 is a section on the line 3—3 of Fig. 2 with parts of the construction broken away; and Fig. 4 is a cross-sectional view through a modified form of ring which I employ.

In Fig 1 of the drawing, I have indicated at 10 a broken section and part elevation of one drum, and, at 10' a broken section of the central portion of an adjacent drum. Drums of the type and kind under consideration have closed end walls, as indicated at 11 and 12, said walls having interlocking flange engagement with the drum proper, as indicated at 11', 12'. The walls of the drum are corrugated at end portions thereof, as indicated at 13 to give strength thereto and at the central portion of the drum are two longitudinally spaced and outwardly projecting rounded circumferential beads 14, 15, the beads of the associate drum being shown at 14', 15'.

At 16 and 17 I have shown two similar coupling rings and at 16', 17' I have shown corresponding rings arranged upon the beads 14', 15'. The rings may be said to be of K-cross-sectional form, that is to say, being defined by an outer perpendicular annular band 18, centrally of the inner surface of which are diverging and curved flanges 19 and 20. The flanges 19 and 20 form, on the inner surface of the rings, a socket 21 which conforms substantially to the contour of the beads 14 and 15 as well as the beads 14', 15'.

The reference numerals 18 through 21 are applied to the ring 16. However, it will be understood that the structures of the rings 17, as well as 16', 17', are identical. The bands 18 and flanges 19 and 20 have their ends welded or otherwise secured together, as indicated at 22 in the elevation of the drum shown in Fig. 1 of the drawing.

From the foregoing, it will be apparent that, in stacking drums having the adaptor rings 16 and 17 mounted thereon, the bands 18 of the rings are brought into close proximity to each other at adjacent portions of the drums and the drums are secured together in forming a nesting of drums by clamps comprising a pair of top and bottom clamp plates 23 and 24. The plates are generally of the contour shown in Fig. 2, in which figure a plan view of the plate 23 is shown. The plates flare to the end portions thereof from the central contracted portion and the plates having side flanges 25 and 26 respectively, which overlie side portions of the bands 18 in supporting the drums against relative displacement one with respect to the other. For sake of clarity, the bands 18 have been shown in a slightly spaced relationship in Figs. 1 and 2. It will be understood, however, that these bands can be brought into abutting relationship in securing adjacent drums together. It will be apparent from a consideration of Figs. 1 and 3 of the drawing that the side portions of the band 18 are parallel with the outer wall of the drum and are in spaced relation thereto.

The flared end portions of the plate 23 have keyhole-type apertures 27 bordered by raised reinforcing walls 28, the apertures 27 being adapted to receive the nuts 29 of bolts 30 so that the plate 23 can be slipped over the nuts and then moved to bring the bolts 30 into the small diameter portion of the apertures 27 which position is indicated in the cross-section of the bolts 30 as shown in Fig. 2 of the drawing.

The bolts 30 are in threaded engagement with bushing portions 31 of the plate 24 and lock nuts 32 are employed to fix the bolts 30 against relative movement on the plate 24. The plate 24 also has side flanges 33, similar to the flanges 25 on the plate 23.

The bolts 30 are sufficiently long to extend between the spaced beads 14 and 15 and to facilitate coupling engagement of the clamp plates with the adaptor rings. In some instances, depending upon the stacking of the drums, a single drum may have four clamp plates coupled therewith to engage four drums spaced around the circumference of said single drum. However, in outer drums of a grouping, two or three clamps would be used. It will be apparent that any desired arrangement of the clamps may be provided, depending upon the type of material and the nesting or grouping of drums which is desired.

By coupling drums together in the manner defined, a fairly large number of drums can be handled collectively in moving the same from one position to another, thus effecting a great saving in time and labor in the shipment or transportation of drums of the kind under consideration.

In Fig. 4 of the drawing, I have shown a slight modification, wherein the adaptor ring is fashioned from a single strip or sheet of metal folded centrally upon itself to form the anular band portion 34 of double wall construction and curved bead engaging flanges 35 and 36. In other words, the ring shown in Fig. 4 will be substantially of the same K-cross-sectional form shown in Figs. 1 to 3, inclusive, but formed from a single sheet rather than as an integral structure as shown in the other figures.

The outer bands of the rings may be said to provide on the drums coupling band portions or coupling flanges. It will also be apparent that, while the rings have been defined as having a K-cross-sectional contour, this contour is defined as viewed in the vertical elevation as shown in Fig. 1. However, viewing the cross-section of the ring horizontally, the ring may be said to comprise a modified T-cross-sectional contour. However, the outer cross-head or band presents the protruding flanges which are essential to establish engagement with the flanges of the coupling plates to give assurance against any possible separation of drums one with respect to the other.

Having fully described my invention, what I claim as new and desire to secure by Letters Patent is:

1. A drum having spaced annular rounded beads intermediate end portions thereof, adaptor coupling rings mounted on said beads, each ring being defined by an outer annular band having curved diverging inner flanges extending from the central portion of the band producing a substantially K-cross-sectional contour to the ring, rings of adjacent drums being adapted to be brought into close proximity to each other in the nesting of a plurality of drums, and a pair of clamp plates adapted to engage the bands of rings of adjacent drums in securing said adjacent drums against relative movement one with respect to the other.

2. A drum having spaced annular rounded beads intermediate end portions thereof, adaptor coupling rings mounted on said beads, each ring being defined by an outer annular band having curved diverging inner flanges extending from the central portion of the band producing a substantially K-cross-sectional contour to the ring, rings of adjacent drums being adapted to be brought into close proximity to each other in the nesting of a plurality of drums, a pair of clamp plates adapted to engage the bands of rings of adjacent drums in securing said adjacent drums against relative movement one with respect to the other, and said rings being in the form of strips, the ends of which are secured together in forming rings firmly enveloping the beads of said drum.

3. In drums, the wall of which has outwardly projecting circumferential beads intermediate end portions thereof, adaptor rings arranged upon and engaging said beads, each of said rings comprising a central portion directly conforming with and engaging at least part of the peripheral contour of the bead, and side portions substantially at the peripheral poriton of said bead and extending above and below said central portion and arranged substantially parallel to and in spaced relation to the wall of the drum.

References Cited in the file of this patent

UNITED STATES PATENTS

| | | |
|---|---|---|
| 550,094 | Blundell | Nov. 19, 1895 |
| 1,125,011 | Draper | Jan. 12, 1915 |
| 1,314,445 | Wacker | Aug. 26, 1919 |
| 2,615,220 | Imparato | Oct. 28, 1952 |